F. H. FISHER.

Hydraulic-Mining Apparatus.

No. 8,876. Reissued Sept. 2, 1879.

Witnesses:

Wm. Floyd Quickett

H. F. Clark

Inventor

Frank H. Fisher per J. L. Boone

Attorney.

UNITED STATES PATENT OFFICE.

FRANK H. FISHER, OF NEVADA CITY, CALIFORNIA.

IMPROVEMENT IN HYDRAULIC MINING APPARATUS.

Specification forming part of Letters Patent No. 110,222, dated December 20, 1870; Reissue No. 5,193, dated December 17, 1872; Reissue No. 8,876, dated September 2, 1879; application filed March 29, 1879.

*To all whom it may concern:*

Be it known that I, FRANK H. FISHER, of Nevada City, Nevada county, State of California, have invented an Improvement in Hydraulic Mining Apparatus; and I do hereby declare the following description and accompanying drawings are sufficient to enable any person skilled in the art or science to which it mostly appertains to make and use my said invention without further invention or experiment.

My invention relates to an improved construction and arrangement of that class of hydraulic pipes and nozzles which are used for directing and delivering a stream or column of water against a bank in hydraulic mining.

My improvement consists in such an arrangement of the pipe and nozzle that the nozzle can have both horizontal and vertical play through the medium of two moving water-tight joints, for the purpose of facing it to any desired point of the compass without shutting off the water or stopping the work of the machine.

Figure 2:
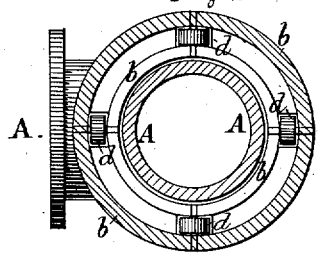
Figure 1:
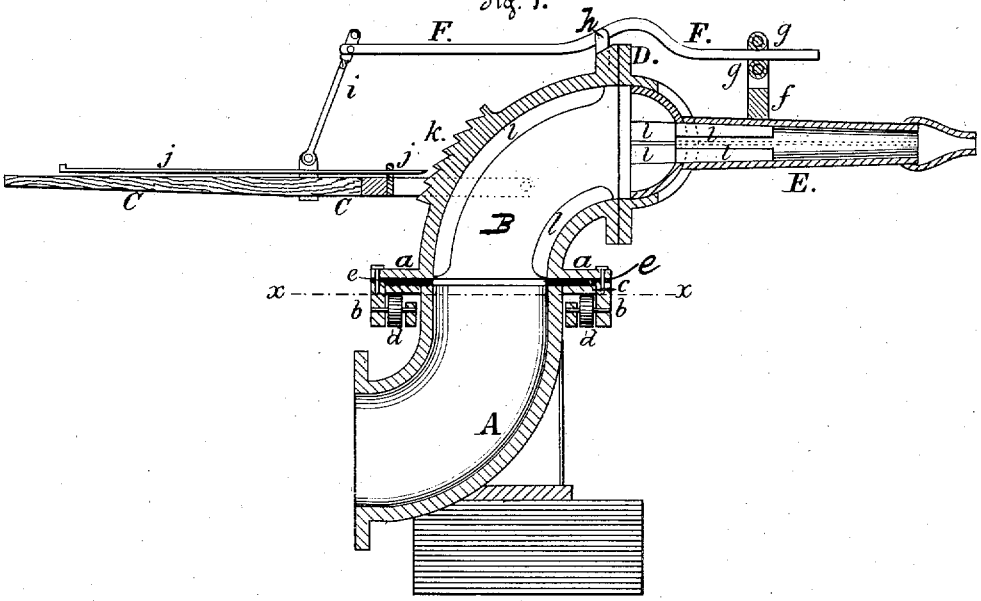
Figure 3:
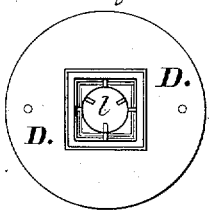
Figure 4:
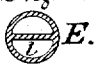

In the drawings, Figure 1 is a longitudinal section of my improved mining apparatus. Fig. 2 is a horizontal section of the same, taken on the plane of the line *x x*, Fig. 1. Fig. 3 is an inner view of the discharge-nozzle; and Fig. 4 is a transverse section of a part of the same.

The same letters of reference in the drawings indicate the same parts.

A represents a section of pipe, through which water is forced by a steam-pump or other forcing apparatus, or by its own pressure when conducted from higher points. This section A, I bend upward in the form of an elbow, as shown at Fig. 1. To the upper end of this section or elbow I connect one end of another elbow, B, by means of a swivel connection or joint, which is formed by the two horizontal flanges *a c* on the outer meeting edges of the sections. These flanges are placed together and held by a ring, *b*, which carries friction-rollers *d d*, that fit and bear against the under side of the lower flange.

Packing *e* is interposed between the flanges *a c*, as shown. The elbow B, to which is pivoted a handle or lever, C, can then be freely turned or swiveled on the elbow A, and still will form a water-tight joint.

To the outer end of the elbow B is screwed a plate, D, which has semicircular projecting ears and flanges on the same to receive the correspondingly-shaped end or ball-joint of the discharge-pipe E.

The pipe E, carrying the nozzle, has a projecting slotted post, *f*, which has friction-rollers *g g*, that work above and below a lever, F, passing between them. The lever F is pivoted to a post, *h*, that projects from the elbow B, and is connected with the lever C by a rod, *i*, while its front end passes through the slotted post *f*, as shown.

The ball-and-socket joint formed by the discharge-pipe E on the elbow B permits the same to be swung up or down at will, while it can be swung horizontally with the elbow B. All the motions can be executed by means of the handle C, which is pivoted to swing up or down. It may be provided with a pawl or slide, *j*, to lock into a rack or toothed projection, K, of the elbow B, for the purpose of securing the nozzle at any desired elevation. The pressure of the water holds the ball-joint closed and water-tight. The discharge-pipe, as well as the swivel-elbow, may have inner ribs or partitions, *l*, for guiding the water straight forward.

By this arrangement the nozzle or discharge-pipe E can be raised or lowered or turned horizontally to any desired position while working.

It will be noticed that both of the joints employed in this machine are close-moving metallic joints—that is, the meeting parts of the joints are made of metal—and more particularly the outer joint, which gives the vertical movement to the discharge-pipe and nozzle, so that the movement of the discharge-section is limited to the single action between the two parts by which it is joined to the swiveled section; or, in other words, there is no movement except at the single point where the parts fit together.

I am aware that hydraulic machines of this class have heretofore been made with horizontal joints for allowing the upper section, B, to swivel in a horizontal plane; and I am also aware that a canvas or hose section has been introduced in the length of the discharge-pipe, in order to give flexibility for directing the forward end of the discharge-pipe independent of the horizontal joint within a limited range both up and down or to either side; but these machines were dangerous, as the flexibility of the hose or canvas section, and its liability to get kinked, would often cause it to be caught by the stream in a wrinkled condition, so that the force of the stream on the bent end would cause the discharge-pipe to fly out of the hands of the attendant, and sweep around in a circle with tremendous force, in many instances wounding, and in some instances killing, the workmen and bystanders. This accident was so common to this class of machines that it became known to miners as "bucking." The greatest care was necessary in handling the pipe, and even then the machine would often buck. It is therefore necessary to confine the movement of the discharge-section to a single moving joint of rigid material, constructed as above described.

In using this machine, the horizontal joint only serves as a means for allowing the upper section, B, and discharge-pipe to be faced around in the required direction, while the forward joint allows a vertical movement to be given to the discharge-pipe, in order to throw the stream at the desired elevation.

Having thus described my invention, what I claim, and desire to secure by Letters Patent, is—

1. The swivel-jointed sections A B and ball-and-socket-jointed sections D E, combined, as described, with the lever F, working through slotted posts *f*, strap *i*, lever C, and pawl and ratchet, *j* K, for the purpose set forth.

2. A ball-and-socket joint for connecting the discharge-pipe of a hydraulic mining apparatus with the end of a swivel-section, B, substantially as above described.

3. The discharge-pipe E, having a semi-cylindrical or ball-shaped enlargement at its base, in combination with a corresponding cup-shaped socket, D, on the end of the horizontally-swiveling section B, substantially as and for the purpose described.

In witness whereof I have hereunto set my hand and seal.

FRANK H. FISHER. [L. S.]

Witnesses:
L. D. LATIMER,
WM. FLOYD DUCKETT.